United States Patent
Du

(10) Patent No.: US 9,565,031 B2
(45) Date of Patent: Feb. 7, 2017

(54) METHOD, CONTROL TERMINAL, AND SYSTEM FOR CONTROLLING ELECTRONIC DEVICE

(71) Applicant: SHENZHEN TCL NEW TECHNOLOGY CO., LTD, Shenzhen, Guangdong (CN)

(72) Inventor: Zhimin Du, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/914,000

(22) PCT Filed: Jul. 9, 2014

(86) PCT No.: PCT/CN2014/081874
§ 371 (c)(1),
(2) Date: Feb. 24, 2016

(87) PCT Pub. No.: WO2015/120690
PCT Pub. Date: Aug. 20, 2015

(65) Prior Publication Data
US 2016/0204952 A1 Jul. 14, 2016

(30) Foreign Application Priority Data
Feb. 17, 2014 (CN) .......................... 2014 1 0053343

(51) Int. Cl.
*H04L 12/28* (2006.01)
*H04L 29/08* (2006.01)
(Continued)

(52) U.S. Cl.
CPC .......... *H04L 12/2818* (2013.01); *H04L 12/24* (2013.01); *H04L 12/28* (2013.01); *H04L 12/281* (2013.01);
(Continued)

(58) Field of Classification Search
CPC ..... G08C 17/02; G08C 23/04; G08C 2201/92; G08C 17/00; G08C 19/28; G08C 2201/93; G08C 2201/21; G08C 2201/41
(Continued)

(56) References Cited

U.S. PATENT DOCUMENTS 6,930,730 B2 * 8/2005 Maxon ................ H04L 12/2805
340/12.53
7,741,953 B2 * 6/2010 Yuasa ..................... G08C 17/00
340/12.51
(Continued)

FOREIGN PATENT DOCUMENTS

CN 1431802 A 7/2003

OTHER PUBLICATIONS

International Search Report of PCT Patent Application No. PCT/CN2014/081874 issued on Nov. 21, 2014.

*Primary Examiner* — Mark Blouin

(57) ABSTRACT

A method for controlling an electronic device. The method comprises: a control terminal starting a service of a self-organizing network, and initializing and displaying an information table of electronic devices currently on the self-organizing network; sending, based on an electronic device selected from the electronic device information table by a user, an update request to the electronic device through a network route of the self-organizing network; receiving device function information fed back by the electronic device according to the update request, and establishing a function calling table according to the device function information; and displaying a control UI of the remote control terminal according to the function calling table and sending an execution instruction to the electronic device according to a function item selected by the user. A control terminal and a system for controlling the electronic device.

(Continued)

Unified management of various electronic devices is implemented, thereby providing convenience.

16 Claims, 2 Drawing Sheets

(51) Int. Cl.
    *H04L 12/24*     (2006.01)
    *H04W 84/18*     (2009.01)

(52) U.S. Cl.
    CPC ........... *H04L 12/2816* (2013.01); *H04L 29/08* (2013.01); *H04L 67/125* (2013.01); *H04W 84/18* (2013.01)

(58) Field of Classification Search
    USPC ...................................................... 340/12.53
    See application file for complete search history.

(56) References Cited

U.S. PATENT DOCUMENTS

| | | | |
|---|---|---|---|
| 8,260,269 B2 * | 9/2012 | Faith ................. | G06Q 30/0201 340/10.1 |
| 8,786,414 B2 * | 7/2014 | Nakajima .............. | G08C 17/02 340/12.22 |

* cited by examiner

METHOD, CONTROL TERMINAL, AND SYSTEM FOR CONTROLLING ELECTRONIC DEVICE

BACKGROUND

Technical Field

The present invention relates to the field of household appliances, and in particular, to a method, a control terminal, and a system for controlling an electronic device.

Related Art

Household appliances play a significant role in daily life of people. Various household appliances greatly improve and facilitate life of people, and also affect some living habits of people. With the improvement of the living standards, people expect the household appliances to be more intelligent, easier to use, and more useful. Household appliances that are frequently used in daily life, for example, a television set, a refrigerator, and a washing machine, are relatively fixedly distributed, and have a low requirement for mobility. During use, a user needs to control the appliances separately instead of managing the appliances uniformly, thereby causing much inconvenience.

The foregoing content is merely intended to help understand the technical solutions of the present invention, but does not indicate an agreement that the foregoing content belongs to the prior art.

SUMMARY

A major objective of the present invention is to provide a method, a control terminal, and a system for controlling an electronic device, for uniformly managing each electronic device.

To achieve the foregoing objective, a method for controlling an electronic device provided by the present invention includes the following steps: starting, by a control terminal, a service of a self-organizing network, and initializing and displaying an information table of electronic devices currently on the self-organizing network;

sending, based on an electronic device selected from the electronic device information table by a user, an update request to the electronic device through a network route of the self-organizing network;

receiving device function information fed back by the electronic device according to the update request, and establishing a function calling table according to the device function information, the function calling table including a plurality of function item control parameters corresponding to functions of the electronic device; and displaying a control UI of the remote control terminal according to the function calling table, so that the user remotely controls and operates the electronic device in the control UI, and sending a corresponding execution instruction to the electronic device according to a function item selected by the user, so as to control the electronic device to execute a corresponding function.

Preferably, the step of starting, by a control terminal, a service of a self-organizing network, and initializing and displaying an information table of electronic devices currently on the self-organizing network includes:

sending, by the control terminal, a query request through the self-organizing network to all electronic devices within a search range of the current self-organizing network according to a user instruction; and acquiring basic information of the electronic devices fed back by the electronic devices, establishing a network-wide electronic device information table, and displaying the electronic device information table through the remotely interactive control UI.

Preferably, the step of sending, based on an electronic device selected from the electronic device information table by a user, an update request to the electronic device through a network route of the self-organizing network includes:

detecting, based on the self-organizing network, whether the control terminal has established a network route from the control terminal to the electronic device selected by the user; and if yes, sending the update request to the electronic device through the established network route; or if not, establishing, according to the self-organizing network, an optimal network route from the control terminal to the electronic device selected by the user, and sending the update request to the electronic device through the established optimal network route.

Preferably, the step of establishing, according to the self-organizing network, an optimal network route from the control terminal to the electronic device selected by the user specifically includes:

allocating identification numbers (IDs) and IP addresses to the electronic devices according to an on-demand driving routing protocol in the self-organizing network and sequence numbers (SNs) of the electronic devices;

initiating, by the control terminal, a routing request to the electronic device selected by the user and adding an ID, a power, a mobility, an electric quantity, and a link quality obtained through calculation, of the control terminal to routing request information, where each adjacent node that has received the routing request information adjusts link quality according to information about the adjacent node, and forwards the routing request information, and finally the routing request information is fed back to the control terminal; and selecting a routing path having a highest link quality value that is fed back, among a plurality of routing paths from the control terminal to the electronic device selected by the user, as the optimal network route.

The present invention further provides a control terminal for controlling an electronic device, including:

a starting module, configured to start a service of a self-organizing network, and initialize and display an information table of electronic devices currently on the self-organizing network;

an update request sending module, configured to send, based on an electronic device selected from the electronic device information table by a user, an update request to the electronic device through a network route of the self-organizing network;

a receiving module, configured to receive device function information fed back by the electronic device according to the update request, and establish a function calling table according to the device function information, the function calling table including a plurality of function item control parameters corresponding to functions of the electronic device in a one-to-one manner; and an execution instruction sending module, configured to display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function.

Preferably, the starting module is configured to:

send a query request through the self-organizing network to all electronic devices within a search range of the current self-organizing network according to a user instruction; and acquire basic information of the electronic devices fed back by the electronic devices, establish a network-wide electronic device information table, and display the electronic device information table through the remotely interactive control UI.

Preferably, the update request sending module is configured to:

detect, based on the self-organizing network, whether the control terminal has established a network route from the control terminal to the electronic device selected by the user;

if yes, send the update request to the electronic device through the established network route; and if not, establish, according to the self-organizing network, an optimal network route from the control terminal to the electronic device selected by the user, and send the update request to the electronic device through the established optimal network route.

Preferably, the update request sending module is further configured to:

allocate IDs and IP addresses to the electronic devices according to an on-demand driving routing protocol in the self-organizing network and SNs of the electronic devices;

initiate a routing request to the electronic device selected by the user and add an ID, a power, a mobility, an electric quantity, and a link quality obtained through calculation, of the control terminal to routing request information, where each adjacent node that has received the routing request information adjusts link quality according to information about the adjacent node, and forwards the routing request information, and finally the routing request information is fed back to the control terminal; and select a routing path having a highest link quality value that is fed back, among a plurality of routing paths from the control terminal to the electronic device selected by the user, as the optimal network route.

The present invention further provides a system for controlling an electronic device, including: a control terminal and an electronic device, where the control terminal includes:

a starting module, configured to start a service of a self-organizing network, and initialize and display an information table of electronic devices currently on the self-organizing network;

an update request sending module, configured to send, based on an electronic device selected from the electronic device information table by a user, an update request to the electronic device through a network route of the self-organizing network;

a receiving module, configured to receive device function information fed back by the electronic device according to the update request, and establish a function calling table according to the device function information, the function calling table including a plurality of function item control parameters corresponding to functions of the electronic device in a one-to-one manner;

an execution instruction sending module, configured to display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function; and the electronic device is configured to feed back device function information of the electronic device to the control terminal according to the update request sent by the control terminal, receive the execution instruction sent by the control terminal, and execute a corresponding function according to the execution instruction.

Preferably, the starting module is configured to:

send a query request through the self-organizing network to all electronic devices within a search range of the current self-organizing network according to a user instruction; and acquire basic information of the electronic devices fed back by the electronic devices, establish a network-wide electronic device information table, and display the electronic device information table through the remotely interactive control UI.

Preferably, the update request sending module is configured to:

detect, based on the self-organizing network, whether the control terminal has established a network route from the control terminal to the electronic device selected by the user;

if yes, send the update request to the electronic device through the established network route; and if not, establish, according to the self-organizing network, an optimal network route from the control terminal to the electronic device selected by the user, and send the update request to the electronic device through the established optimal network route.

Preferably, the update request sending module is further configured to:

allocate IDs and IP addresses to the electronic devices according to an on-demand driving routing protocol in the self-organizing network and SNs of the electronic devices;

initiate a routing request to the electronic device selected by the user and add an ID, a power, a mobility, an electric quantity, and a link quality obtained through calculation, of the control terminal to routing request information, where each adjacent node that has received the routing request information adjusts link quality according to information about the adjacent node, and forwards the routing request information, and finally the routing request information is fed back to the control terminal; and select a routing path having a highest link quality value that is fed back, among a plurality of routing paths from the control terminal to the electronic device selected by the user, as the optimal network route.

Preferably, the electronic device is further configured to:

parse the execution instruction, call a corresponding functional function, and execute a corresponding functional operation.

In the method, the control terminal, and the system for controlling an electronic device provided in the present invention, by starting a service of a self-organizing network, a control terminal is interconnected to various electronic devices, device function information of an electronic device that is selected by a user and needs to be controlled is acquired, and a function calling table is established according to the device function information, so that the user can select a corresponding function item through the function calling table, and finally the electronic device selected by the user executes a corresponding function. Unified management of the electronic devices is implemented, and an independent network support facility is not required, thereby providing convenience.

Implementations of the objective, functional features, and advantages of the present invention are further described with reference to the accompanying drawings in combination with the embodiments.

DETAILED DESCRIPTION

It should be understood that the specific embodiments described herein are merely used to interpret the present invention, but are not intended to limit the present invention.

The solutions of the embodiments of the present invention are mainly: By starting a service of a self-organizing network, a control terminal is interconnected to various electronic devices, device function information of an electronic device that is selected by a user and needs to be controlled is acquired, and a function calling table is established according to the device function information, so that the user can select a corresponding function item through the function calling table, and finally the electronic device selected by the user executes a corresponding function. Unified management of the electronic devices is implemented.

Figure 1:
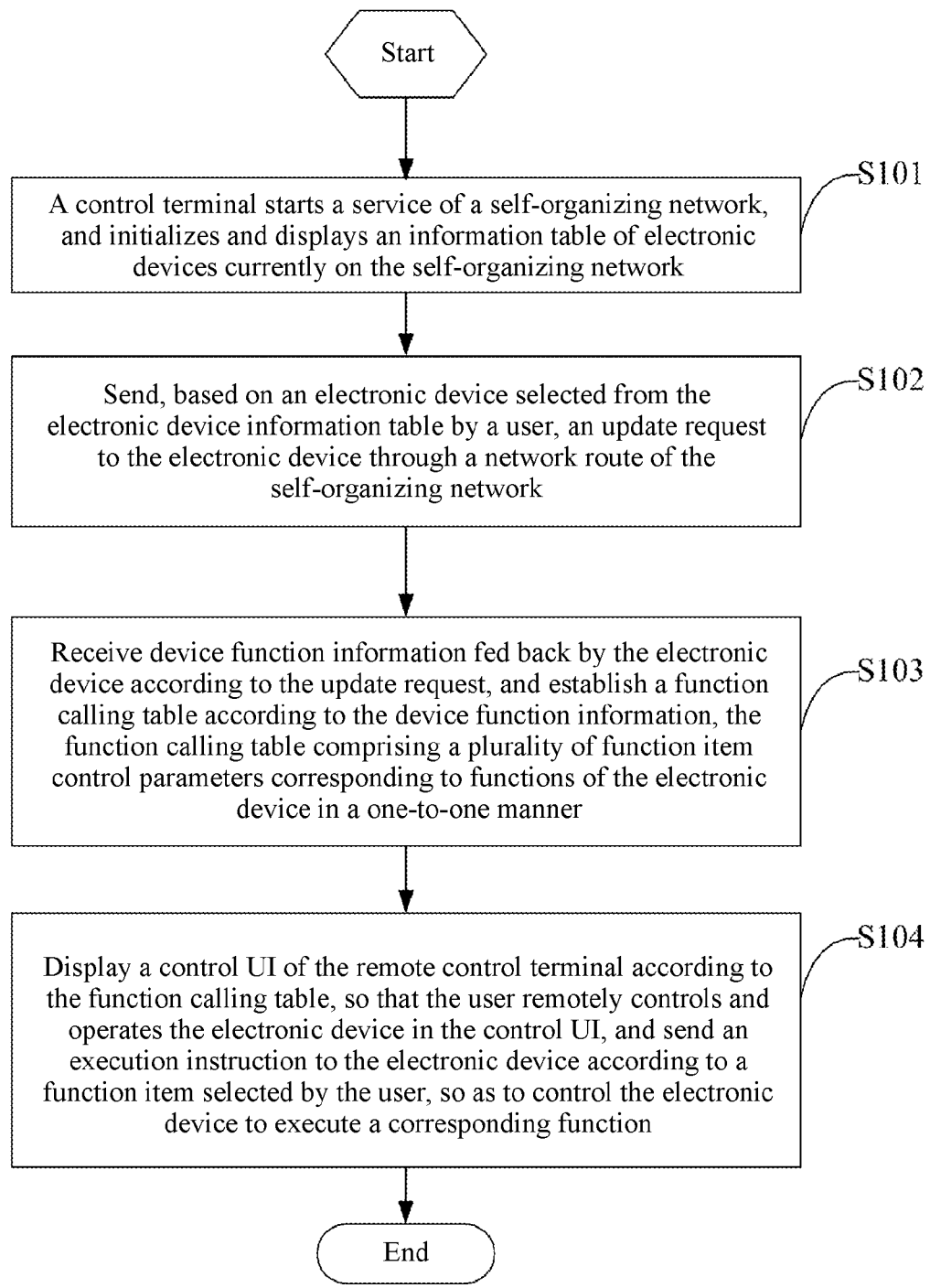
FIG. 1 is a schematic flowchart of a method for controlling an electronic device according to an embodiment of the present invention.

The present invention provides a method for controlling an electronic device. Referring to FIG. 1, in an embodiment, the method for controlling an electronic device includes:

Step S101: A control terminal starts a service of a self-organizing network, and initializes and displays an information table of electronic devices currently on the self-organizing network.

In this embodiment, the control terminal may be an Android operating system-based intelligent consumption electronic device, for example, a smart television set or a tablet. To make it convenient to describe, description is provided below by using a smart television set as an example.

In this embodiment, an operating system installed in a smart household appliance varies with requirements of a service to be provided. A smart television set is generally provided with an Android system, and household equipment that focuses on functionality and has a low requirement for interactivity, such as a smart refrigerator and washing machine, is generally provided with a Linux operating system. The smart television set provided with the Android system is used as a control terminal for unified management.

First, a service of a self-organizing network (Ad hoc network) is started on the smart television set. The Ad hoc network is a multi-hop, centerless, and self-organizing wireless network, and is also referred to as a multi-hop network, an infrastructureless network, or a self-organizing network. The entire network does not have fixed infrastructure. Each node is movable and can dynamically keep in contact with another node in any manner. After the service of the self-organizing network is started, a query request is sent in a broadcast manner to all electronic devices within a search range of the current self-organizing network through the self-organizing network according to the user instruction, so as to determine all electronic devices that the smart television set can contact with through the self-organizing network. After receiving the query request, each electronic device in the current self-organizing network feeds back basic information of the electronic device to the smart television set. The basic information includes basic information such as a name and a device number of the electronic device. The smart television set acquires the basic information of the electronic device fed back by the electronic device, establishes an electronic device information table, and displays the electronic device information table in an interface on a screen of the smart television set, that is, a remotely interactive control UI, so that a user acquires basic information of all the electronic devices that the smart television set can contact with through the self-organizing network.

Step S102: Send, based on an electronic device selected from the electronic device information table by a user, an update request to the electronic device through a network route of the self-organizing network.

The user selects an electronic device that needs to be controlled from the electronic device information table displayed on the smart television set, and the smart television set sends an update request to the electronic device through a network route of the self-organizing network.

First, whether a network route from the smart television set to the electronic device selected by the user has been established in the self-organizing network is detected; and if yes, the update request is directly sent to the electronic device through the established network route; or if not, an optimal network route from the smart television set to the electronic device selected by the user is established according to the self-organizing network, and the update request is then sent to the electronic device through the established optimal network route.

Specifically, when the optimal network route from the smart television set to the electronic device selected by the user is established according to the self-organizing network, first, during initialization according to an on-demand driving routing protocol in the self-organizing network, IDs and IP addresses are allocated to the electronic devices according to the on-demand driving routing protocol in the self-organizing network and SNs of the electronic devices. First, the IDs of the electronic devices are obtained through calculation according to the SNs of the electronic devices by using a hash function, and the IP addresses of the electronic devices are obtained through calculation according to the ID, in a form of, for example, 192.168.0.id. The hash function is indicated by the following formula: ID=(SN+t) %253+2, where t is a current system time. The obtained IDs may be added by 2 and then divided by 253 to obtain remainders, so as to ensure that the finally obtained IP addresses are within an interval of [192.168.0.2, 192.168.0.254]. After an IP address of each electronic device in the self-organizing network is allocated and determined, an optimal routing path can be calculated and selected.

The smart television set initiates a routing request to the electronic device selected by the user and adds an ID, a power, a mobility, an electric quantity, and a link quality obtained through calculation, of the control terminal to routing request information, where each adjacent node that has received the routing request information in the self-organizing network adjusts link quality according to information about the adjacent node, and forwards the routing request information, and finally the routing request information is fed back to the smart television set. A calculation formula of a link quality value Q of each routing path is as follows:

$$Q = \left[\sum_{i=1}^{n}(P_i - PW_i)/n\right] - \theta M - \varphi hops$$

where θ and φ represent empirical parameters, and are both preset to $$\left[\sum_{}^{n} (P_i - PW_i)/n\right]^* n/10$$

herein, where P represents an electric quantity, when an electronic device at the node is powered by an alternating current, the electronic device is not involved in the calculation of the link quality value, and when the electronic device at the node is powered by a battery, an actual electric quantity of the battery is set to P; PW represents an operating power of the electronic device; M represents the mobility, indicated by a recorded quantity of times of movement of the electronic device within a time from routing protocol initialization to a currently started actual routing operation; hops represents a quantity of hops among nodes, and generally a motion from one electronic device to another one is one hop.

Generally, there is a plurality of selectable routing paths between the smart television set and the electronic device selected by the user. A routing path having a highest link quality value Q that is fed back is selected from the plurality of routing paths from the smart television set to the electronic device selected by the user as the optimal network route. Data transmission between the smart television set and the electronic device selected by the user and through the optimal network route costs the least and is more stable and efficient.

Besides, in consideration of features, such as a general household network topology environment is relatively fixed, does not have a strong mobility, and network support requires automation, a route discovery function of the on-demand driving routing protocol in the self-organizing network is very practical. In this embodiment, a route discovery type is added to the protocol of the self-organizing network, to initialize a current network status and allocate an ID and an IP to each electronic device currently on the network, so that a threshold for an ordinary user to use the service of the self-organizing network can be lowered, and a process for configuring the self-organizing network can be simplified. Moreover, the feature of supporting a high-speed mobile device in the on-demand driving routing protocol in the self-organizing network is not needed in this embodiment, and can be removed from the on-demand driving routing protocol, so as to reduce a system load.

A route discovery process of the on-demand driving routing protocol is primarily used for discovering an optical route. In this embodiment, a route discovery type is added to initialize network-wide topology information including information about all electronic devices that are currently turned on and start the service of the Ad hoc network. An adjusted route discovery data pack (RREQ) herein is in a format as follows:

Type (Network-wide
information discovery type)    J|R|G|D|U . . .    Reserved    Hop Count
RREQ ID
Destination IP Address (intranet broadcast address, for example, 192.168.0.255)
Destination Sequence Number
Originator IP Address
Originator Sequence Number -continued Type (Network-wide
information discovery type)    J|R|G|D|U . . .    Reserved    Hop Count
Device Information: Basic information of the electronic devices (needed information about an electronic device can be added according to needs, so that the information can be fed back to the smart television set during the initialization process)

Step S103: Receive device function information fed back by the electronic device according to the update request, and establish a function calling table according to the device function information, the function calling table including a plurality of function item control parameters corresponding to functions of the electronic device in a one-to-one manner.

After receiving the update request sent by the smart television set, the electronic device collects relevant information about the electronic device, for example, operating state information, a performance parameter, and a function item. The electronic device may also feed back a calling number corresponding to each function item to the smart television set. The smart television set receives the device function information fed back by the electronic device according to the update request, and establishes a function calling table according to content in the device function information. The function calling table includes a plurality of function item control parameters corresponding to functions of the electronic device in a one-to-one manner.

Each electronic device has a function calling table. The smart television set stores a function calling table of network-wide electronic devices.

After receiving the query request, each electronic device initializes a local function calling table, and the structure may be as follows:

| Function name | Char *name |
| Function ID | Int id |
| Function execution function | Int(*func)(int id) |
| Function activation status | Boolean status |
| Other extended items | . . . |

Each electronic device has a function calling (that is, function implementation function) table. The smart television set sends a calling request to the electronic device. After receiving the calling request, the electronic device queries the local function calling table and calls a corresponding function for implementation.

After receiving the function calling table of the electronic device currently on the network, the smart television set adds the function calling table to the function calling table of the network-wide electronic devices that is maintained by the smart television set, with a structure as follows:

| Quantity of network-wide electronic devices | Int num__entries |
| Quantity of electronic devices currently on the network | Int num__active |
| Function calling table of remote electronic devices | List_t network_devices_table_item[REMOTE_TABLESIZE] |
| Other extended items | . . . |

Step S104: Display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function.

The established function calling table is displayed to the user through the remotely interactive control UI on the control terminal. The user may remotely exchange information with the electronic device in the control UI, so as to remotely control and operate the electronic device.

The user selects a function item of the electronic device that needs to be controlled and operated from the function calling table in the control UI through the smart television set. The smart television set sends a corresponding execution instruction to the electronic device according to the selection of the user. The execution instruction includes the function item of the electronic device and a calling number corresponding to the function item, so that the electronic device executes the corresponding function, so as to control the electronic device.

In this embodiment, according to the foregoing solution, unified management of various electronic devices is implemented, and an independent network support facility is not required, thereby providing convenience.

Figure 2:
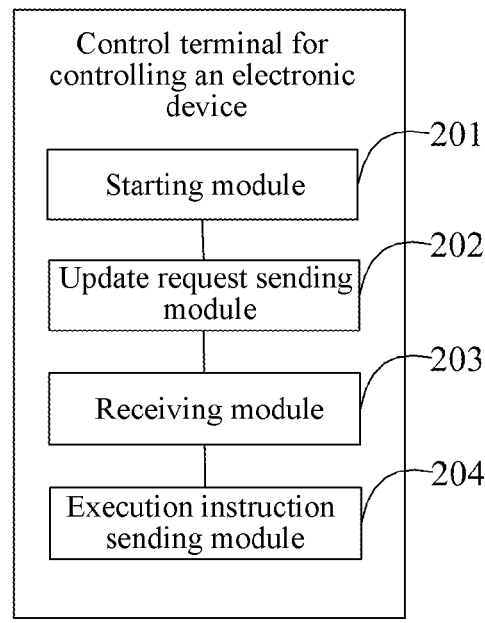
FIG. 2 is a schematic structural diagram of a control terminal for controlling an electronic device according to an embodiment of the present invention.

The present invention further provides a control terminal for controlling an electronic device. Referring to FIG. 2, in an embodiment, the control terminal for controlling an electronic device includes: a starting module 201, an update request sending module 202, a receiving module 203, and an execution instruction sending module 204.

The starting module 201 is configured to start a service of a self-organizing network, and initialize and display an information table of electronic devices currently on the self-organizing network.

In this embodiment, the control terminal may be an Android operating system-based intelligent consumption electronic device, for example, a smart television set or a tablet. To make it convenient to describe, description is provided below by using a smart television set as an example.

In this embodiment, an operating system installed in a smart household appliance varies with requirements of a service to be provided. A smart television set is generally provided with an Android system, and household equipment that focuses on functionality and has a low requirement for interactivity, such as a smart refrigerator and washing machine, is generally provided with a Linux operating system. The smart television set provided with the Android system is used as a control terminal for unified management.

First, a service of a self-organizing network (Ad hoc network) is started on the smart television set. The Ad hoc network is a multi-hop, centerless, and self-organizing wireless network, and is also referred to as a multi-hop network, an infrastructureless network, or a self-organizing network. The entire network does not have fixed infrastructure. Each node is movable and can dynamically keep in contact with another node in any manner. After the service of the self-organizing network is started, a query request is sent in a broadcast manner to all electronic devices within a search range of the current self-organizing network through the self-organizing network according to the user instruction, so as to determine all electronic devices that the smart television set can contact with through the self-organizing network. After receiving the query request, each electronic device in the current self-organizing network feeds back basic information of the electronic device to the smart television set. The basic information includes basic information such as a name and a device number of the electronic device. The smart television set acquires the basic information of the electronic device fed back by the electronic device, establishes an electronic device information table, and displays the electronic device information table in an interface on a screen of the smart television set, that is, a remotely interactive control UI, so that a user acquires basic information of all the electronic devices that the smart television set can contact with through the self-organizing network.

The update request sending module 202 is configured to send, based on an electronic device selected from the electronic device information table by a user, an update request to the electronic device through a network route of the self-organizing network.

The user selects an electronic device that needs to be controlled from the electronic device information table displayed on the smart television set, and the smart television set sends an update request to the electronic device through a network route of the self-organizing network.

First, whether a network route from the smart television set to the electronic device selected by the user has been established in the self-organizing network is detected; and if yes, the update request is directly sent to the electronic device through the established network route; or if not, an optimal network route from the smart television set to the electronic device selected by the user is established according to the self-organizing network, and the update request is then sent to the electronic device through the established optimal network route.

Specifically, when the optimal network route from the smart television set to the electronic device selected by the user is established according to the self-organizing network, first, during initialization according to an on-demand driving routing protocol in the self-organizing network, IDs and IP addresses are allocated to the electronic devices according to the on-demand driving routing protocol in the self-organizing network and SNs of the electronic devices. First, the IDs of the electronic devices are obtained through calculation according to the SNs of the electronic devices by using a hash function, and the IP addresses of the electronic devices are obtained through calculation according to the ID, in a form of, for example, 192.168.0.id. The hash function is indicated by the following formula: ID=(SN+t) %253+2, where t is a current system time. The obtained IDs may be added by 2 and then divided by 253 to obtain remainders, so as to ensure that the finally obtained IP addresses are within an interval of [192.168.0.2, 192.168.0.254]. After an IP address of each electronic device in the self-organizing network is allocated and determined, an optimal routing path can be calculated and selected.

The smart television set initiates a routing request to the electronic device selected by the user and adds an ID, a power, a mobility, an electric quantity, and a link quality obtained through calculation, of the control terminal to routing request information, where each adjacent node that has received the routing request information in the self-organizing network adjusts link quality according to information about the adjacent node, and forwards the routing request information, and finally the routing request information is fed back to the smart television set. A calculation formula of a link quality value Q of each routing path is as follows:

$$Q = \left[\sum_{i=1}^{n} (P_i - PW_i)/n\right] - \theta M - \varphi hops$$

where θ and φ represent empirical parameters, and are both preset to $$\left[\sum_{}^{n} (P_i - PW_i)/n\right]^* n/10$$

herein, where P represents an electric quantity, when an electronic device at the node is powered by an alternating current, the electronic device is not involved in the calculation of the link quality value, and when the electronic device at the node is powered by a battery, an actual electric quantity of the battery is set to P; PW represents an operating power of the electronic device; M represents the mobility, indicated by a recorded quantity of times of movement of the electronic device within a time from routing protocol initialization to a currently started actual routing operation; hops represents a quantity of hops among nodes, and generally a motion from one electronic device to another one is one hop.

Generally, there is a plurality of selectable routing paths between the smart television set and the electronic device selected by the user. A routing path having a highest link quality value Q that is fed back is selected from the plurality of routing paths from the smart television set to the electronic device selected by the user as the optimal network route. Data transmission between the smart television set and the electronic device selected by the user and through the optimal network route costs the least and is more stable and efficient.

Besides, in consideration of features, such as a general household network topology environment is relatively fixed, does not have a strong mobility, and network support requires automation, a route discovery function of the on-demand driving routing protocol in the self-organizing network is very practical. In this embodiment, a route discovery type is added to the protocol of the self-organizing network, to initialize a current network status and allocate an ID and an IP to each electronic device currently on the network, so that a threshold for an ordinary user to use the service of the self-organizing network can be lowered, and a process for configuring the self-organizing network can be simplified. Moreover, the feature of supporting a high-speed mobile device in the on-demand driving routing protocol in the self-organizing network is not needed in this embodiment, and can be removed from the on-demand driving routing protocol, so as to reduce a system load.

A route discovery process of the on-demand driving routing protocol is primarily used for discovering an optical route. In this embodiment, a route discovery type is added to initialize network-wide topology information including information about all electronic devices that are currently turned on and start the service of the Ad hoc network. An adjusted route discovery data pack (RREQ) herein is in a format as follows:

| | |
|---|---|
| Type (Network-wide information discovery type) | J\|R\|G\|D\|U . . . Reserved HopCount |
| RREQ ID | |
| Destination IP Address (intranet broadcast address, for example, 192.168.0.255) | |
| Destination Sequence Number | |
| Originator IP Address | |
| Originator Sequence Number | |

-continued

| | |
|---|---|
| Type (Network-wide information discovery type) | J\|R\|G\|D\|U . . . Reserved HopCount |
| Device Information: Basic information of the electronic devices (needed information about an electronic device can be added according to needs, so that the information can be fed back to the smart television set during the initialization process) | |

The receiving module 203 is configured to receive device function information fed back by the electronic device according to the update request, and establish a function calling table according to the device function information, the function calling table including a plurality of function item control parameters corresponding to functions of the electronic device in a one-to-one manner.

After receiving the update request sent by the smart television set, the electronic device collects relevant information about the electronic device, for example, operating state information, a performance parameter, and a function item. The electronic device may also feed back a calling number corresponding to each function item to the smart television set. The smart television set receives the device function information fed back by the electronic device according to the update request, and establishes a function calling table according to content in the device function information. The function calling table includes a plurality of function item control parameters corresponding to functions of the electronic device in a one-to-one manner.

Each electronic device has a function calling table. The smart television set stores a function calling table of network-wide electronic devices.

After receiving the query request, each electronic device initializes a local function calling table, and the structure may be as follows:

| | |
|---|---|
| Function name | Char *name |
| Function ID | Int id |
| Function execution function | Int(*func)(int id) |
| Function activation status | Boolean status |
| Other extended items | . . . |

Each electronic device has a function calling (that is, function implementation function) table. The smart television set sends a calling request to the electronic device. After receiving the calling request, the electronic device queries the local function calling table and calls a corresponding function for implementation.

After receiving the function calling table of the electronic device currently on the network, the smart television set adds the function calling table to the function calling table of the network-wide electronic devices that is maintained by the smart television set, with a structure as follows:

| | |
|---|---|
| Quantity of network-wide electronic devices | Int num_entries |
| Quantity of electronic devices currently on the network | Int num_active |
| Function calling table of remote electronic devices | List_t network_devices_table_item[REMOTE_TABLESIZE] |
| Other extended items | . . . |

The execution instruction sending module 204 is configured to display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function.

The established function calling table is displayed to the user through the remotely interactive control UI on the control terminal. The user may remotely exchange information with the electronic device in the control UI, so as to remotely control and operate the electronic device.

The user selects a function item of the electronic device that needs to be controlled and operated from the function calling table in the control UI through the smart television set. The smart television set sends a corresponding execution instruction to the electronic device according to the selection of the user. The execution instruction includes the function item of the electronic device and a calling number corresponding to the function item, so that the electronic device executes the corresponding function, so as to control the electronic device.

In this embodiment, according to the foregoing solution, unified management of various electronic devices is implemented, and an independent network support facility is not required, thereby providing convenience.

Figure 3:
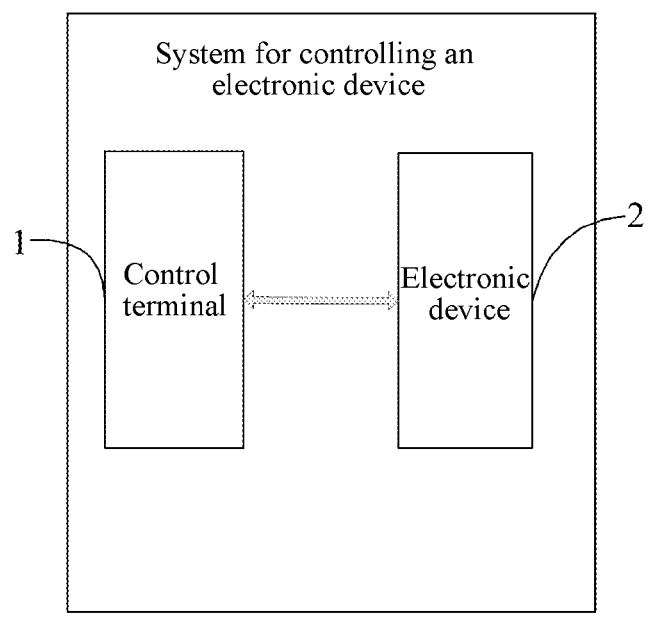
FIG. 3 is a schematic structural diagram of a system for controlling an electronic device according to an embodiment of the present invention.

The present invention further provides a system for controlling an electronic device. Referring to FIG. 3, in an embodiment, the system for controlling an electronic device includes: a control terminal 1 and an electronic device 2.

The control terminal 1 is the foregoing control terminal, and operating principles of the control terminal 1 are described above, which are not described again herein.

The electronic device 2 is configured to feed back device function information of the electronic device 2 to the control terminal 1 according to an update request sent by the control terminal 1, receive an execution instruction sent by the control terminal 1, and execute a corresponding function according to the execution instruction.

After receiving the execution instruction sent by the control terminal 1, the electronic device 2 parses the execution instruction, calls a corresponding functional function according to a calling number obtained through parsing, executes a corresponding functional operation, and starts a function required by the user.

In this embodiment, by starting a service of a self-organizing network, a control terminal is interconnected to various electronic devices, device function information of an electronic device that is selected by a user and needs to be controlled is acquired, and a function calling table is established according to the device function information, so that the user can select a corresponding function item through the function calling table, and finally the electronic device selected by the user executes a corresponding function. Unified management of the electronic devices is implemented, and an independent network support facility is not required, thereby providing convenience.

The SNs of the embodiments of the present invention are merely for the convenience of description but do not indicate the preference of the embodiments. Through the foregoing description of the embodiments, it is apparent to persons skilled in the art that the present invention may be accomplished by software plus necessary universal hardware, and certainly may also be accomplished by hardware, but in most cases, the present invention is preferably implemented through the former method. Based on the understanding, the technical solutions of the present invention or the part that makes contributions to the prior art can be substantially embodied in the form of a software product. The computer software product may be stored in a storage medium (for example, a ROM/RAM, a magnetic disc, or an optical disc), and contain several instructions used to instruct a computer device (for example, a mobile phone, a computer, a server, or a network device) to perform the method according to the embodiments of the present invention.

The foregoing descriptions are merely preferred embodiments of the present invention but are not intended to limit the patent scope of the present invention. Any equivalent modifications made to the structures or processes based on the content of the specification and the accompanying drawings of the present invention for direct or indirect use in other relevant technical fields shall also be encompassed in the patent protection scope of the present invention.

What is claimed is:

1. A method for controlling an electronic device, comprising the following steps:
   starting, by a control terminal, a service of a self-organizing network, and initializing and displaying an information table of electronic devices currently on the self-organizing network;
   sending, based on an electronic device selected from the electronic device information table by a user, an update request to the electronic device through a network route of the self-organizing network;
   receiving device function information fed back by the electronic device according to the update request, and establishing a function calling table according to the device function information, the function calling table comprising a plurality of function item control parameters corresponding to functions of the electronic device; and
   displaying a control UI of the remote control terminal according to the function calling table, so that the user remotely controls and operates the electronic device in the control UI, and sending a corresponding execution instruction to the electronic device according to a function item selected by the user, so as to control the electronic device to execute a corresponding function.

2. The method for controlling an electronic device according to claim 1, wherein the step of starting, by a control terminal, a service of a self-organizing network, and initializing and displaying an information table of electronic devices currently on the self-organizing network comprises:
   sending, by the control terminal, a query request through the self-organizing network to all electronic devices within a search range of the current self-organizing network according to a user instruction; and
   acquiring basic information of the electronic devices fed back by the electronic devices, establishing a network-wide electronic device information table, and displaying the electronic device information table through the remotely interactive control UI.

3. The method for controlling an electronic device according to claim 2, wherein the step of sending, based on an electronic device selected from the electronic device information table by a user, an update request to the electronic device through a network route of the self-organizing network comprises:
   detecting, based on the self-organizing network, whether the control terminal has established a network route from the control terminal to the electronic device selected by the user; and
   if yes, sending the update request to the electronic device through the established network route; or if not, establishing, according to the self-organizing network, an optimal network route from the control terminal to the electronic device selected by the user, and sending the update request to the electronic device through the established optimal network route.

4. The method for controlling an electronic device according to claim 3, wherein the step of establishing, according to the self-organizing network, an optimal network route from the control terminal to the electronic device selected by the user specifically comprises:

allocating identification numbers (IDs) and IP addresses to the electronic devices according to an on-demand driving routing protocol in the self-organizing network and sequence numbers (SNs) of the electronic devices;

initiating, by the control terminal, a routing request to the electronic device selected by the user and adding an ID, a power, a mobility, an electric quantity, and a link quality obtained through calculation, of the control terminal to routing request information, wherein each adjacent node that has received the routing request information adjusts link quality according to information about the adjacent node, and forwards the routing request information, and finally the routing request information is fed back to the control terminal; and selecting a routing path having a highest link quality value that is fed back, among a plurality of routing paths from the control terminal to the electronic device selected by the user, as the optimal network route.

5. A control terminal for controlling an electronic device, comprising:

a starting module, configured to start a service of a self-organizing network, and initialize and display an information table of electronic devices currently on the self-organizing network;

an update request sending module, configured to send, based on an electronic device selected from the electronic device information table by a user, an update request to the electronic device through a network route of the self-organizing network;

a receiving module, configured to receive device function information fed back by the electronic device according to the update request, and establish a function calling table according to the device function information, the function calling table comprising a plurality of function item control parameters corresponding to functions of the electronic device in a one-to-one manner; and an execution instruction sending module, configured to display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function.

6. The control terminal for controlling an electronic device according to claim 5, wherein the starting module is configured to:

send a query request through the self-organizing network to all electronic devices within a search range of the current self-organizing network according to a user instruction; and acquire basic information of the electronic devices fed back by the electronic devices, establish a network-wide electronic device information table, and display the electronic device information table through the remotely interactive control UI.

7. The control terminal for controlling an electronic device according to claim 6, wherein the update request sending module is configured to:

detect, based on the self-organizing network, whether the control terminal has established a network route from the control terminal to the electronic device selected by the user;

if yes, send the update request to the electronic device through the established network route; and if not, establish, according to the self-organizing network, an optimal network route from the control terminal to the electronic device selected by the user, and send the update request to the electronic device through the established optimal network route.

8. The control terminal for controlling an electronic device according to claim 7, wherein the update request sending module is further configured to:

allocate identification numbers (IDs) and IP addresses to the electronic devices according to an on-demand driving routing protocol in the self-organizing network and sequence numbers (SNs) of the electronic devices;

initiate a routing request to the electronic device selected by the user and add an ID, a power, a mobility, an electric quantity, and a link quality obtained through calculation, of the control terminal to routing request information, wherein each adjacent node that has received the routing request information adjusts link quality according to information about the adjacent node, and forwards the routing request information, and finally the routing request information is fed back to the control terminal; and select a routing path having a highest link quality value that is fed back, among a plurality of routing paths from the control terminal to the electronic device selected by the user, as the optimal network route.

9. A system for controlling an electronic device, comprising: a control terminal and an electronic device, wherein the control terminal comprises:

a starting module, configured to start a service of a self-organizing network, and initialize and display an information table of electronic devices currently on the self-organizing network;

an update request sending module, configured to send, based on an electronic device selected from the electronic device information table by a user, an update request to the electronic device through a network route of the self-organizing network;

a receiving module, configured to receive device function information fed back by the electronic device according to the update request, and establish a function calling table according to the device function information, the function calling table comprising a plurality of function item control parameters corresponding to functions of the electronic device in a one-to-one manner; and an execution instruction sending module, configured to display a control UI of the remote control terminal according to the function calling table, so that the user remotely controls and operates the electronic device in the control UI, and send a corresponding execution instruction to the electronic device according to a function item selected by the user, so as to control the electronic device to execute a corresponding function; and the electronic device is configured to feed back device function information of the electronic device to the control terminal according to the update request sent by the control terminal, receive the execution instruction sent by the control terminal, and execute a corresponding function according to the execution instruction.

10. The system for controlling an electronic device according to claim 9, wherein the starting module is configured to:
send a query request through the self-organizing network to all electronic devices within a search range of the current self-organizing network according to a user instruction; and
acquire basic information of the electronic devices fed back by the electronic devices, establish a network-wide electronic device information table, and display the electronic device information table through the remotely interactive control UI.

11. The system for controlling an electronic device according to claim 10, wherein the update request sending module is configured to:
detect, based on the self-organizing network, whether the control terminal has established a network route from the control terminal to the electronic device selected by the user;
if yes, send the update request to the electronic device through the established network route; and
if not, establish, according to the self-organizing network, an optimal network route from the control terminal to the electronic device selected by the user, and send the update request to the electronic device through the established optimal network route.

12. The system for controlling an electronic device according to claim 11, wherein the update request sending module is further configured to:
allocate identification numbers (IDs) and IP addresses to the electronic devices according to an on-demand driving routing protocol in the self-organizing network and sequence numbers (SNs) of the electronic devices;
initiate a routing request to the electronic device selected by the user and add an ID, a power, a mobility, an electric quantity, and a link quality obtained through calculation, of the control terminal to routing request information,
wherein each adjacent node that has received the routing request information adjusts link quality according to information about the adjacent node, and forwards the routing request information, and finally the routing request information is fed back to the control terminal; and
select a routing path having a highest link quality value that is fed back, among a plurality of routing paths from the control terminal to the electronic device selected by the user, as the optimal network route.

13. The system for controlling an electronic device according to claim 9, wherein the electronic device is further configured to:
parse the execution instruction, call a corresponding functional function, and execute a corresponding functional operation.

14. The system for controlling an electronic device according to claim 10, wherein the electronic device is further configured to:
parse the execution instruction, call a corresponding functional function, and execute a corresponding functional operation.

15. The system for controlling an electronic device according to claim 11, wherein the electronic device is further configured to:
parse the execution instruction, call a corresponding functional function, and execute a corresponding functional operation.

16. The system for controlling an electronic device according to claim 12, wherein the electronic device is further configured to:
parse the execution instruction, call a corresponding functional function, and execute a corresponding functional operation.

* * * * *